US011036126B2

(12) United States Patent
Lin et al.

(10) Patent No.: US 11,036,126 B2
(45) Date of Patent: *Jun. 15, 2021

(54) SEMICONDUCTOR FABRICATION DESIGN RULE LOOPHOLE CHECKING FOR DESIGN FOR MANUFACTURABILITY OPTIMIZATION

(71) Applicant: INTERNATIONAL BUSINESS MACHINES CORPORATION, Armonk, NY (US)

(72) Inventors: Chieh-Yu Lin, Hopewell Junction, NY (US); Dongbing Shao, Wappingers Falls, NY (US); Kehan Tian, Poughkeepsie, NY (US); Zheng Xu, Wappingers Falls, NY (US)

(73) Assignees: INTERNATIONAL BUSINESS MACHINES CORPORATION, Armonk, NY (US); GLOBALFOUNDRIES, INC

(*) Notice: Subject to any disclaimer, the term of this patent is extended or adjusted under 35 U.S.C. 154(b) by 0 days.

This patent is subject to a terminal disclaimer.

(21) Appl. No.: 16/441,911

(22) Filed: Jun. 14, 2019

(65) Prior Publication Data
US 2019/0294039 A1    Sep. 26, 2019

Related U.S. Application Data

(63) Continuation of application No. 15/696,505, filed on Sep. 6, 2017, now Pat. No. 10,394,116.

(51) Int. Cl.
*G06F 30/33* (2020.01)
*G03F 1/36* (2012.01)
(Continued)

(52) U.S. Cl.
CPC ............... *G03F 1/36* (2013.01); *G03F 1/38* (2013.01); *G03F 1/70* (2013.01); *G06F 30/20* (2020.01);
(Continued)

(58) Field of Classification Search
CPC .... G06F 2111/08; G06F 30/39; G06F 30/367; G06F 30/398; G06F 2119/18;
(Continued)

(56) References Cited

U.S. PATENT DOCUMENTS 6,553,558 B2    4/2003    Palmer et al.
7,624,369 B2    11/2009    Graur et al.
(Continued)

OTHER PUBLICATIONS

Fu et al., "DFM Viewpoints of Cell-level Layout Assessments and Indications for Concurrent Layout Optimization," Proc. SPIE 7122, Photomask Technology 2008, 71221Z, Oct. 17, 2008, pp. 1-8.
(Continued)

*Primary Examiner* — Binh C Tat
(74) *Attorney, Agent, or Firm* — Cantor Colburn LLP; Steven Meyers

(57) ABSTRACT

Technical solutions are described for fabricating a semiconductor wafer. An example method includes generating a process assumption band for an element of the wafer. The process assumption band depicts a shape of the element based on a set of process variations in a photolithographic process used for fabricating the wafer. The method also includes generating a process variation band for the element of the wafer based on optical process correction simulation of the photolithographic process using design rules associated with the wafer. The method also includes determining a deviation between the process assumption band and the process variation band, and recalculating one or more design rules from the design rules associated with the wafer based on the deviation. The method also includes updating the
(Continued)

design of the wafer in response to the process variation band not being changeable to match the process assumption band, after recalculating the design rules.

10 Claims, 9 Drawing Sheets

(51) Int. Cl.
| | |
|---|---|
| *G03F 1/70* | (2012.01) |
| *G03F 1/38* | (2012.01) |
| *G06F 30/20* | (2020.01) |
| *G06F 30/398* | (2020.01) |
| *G06F 119/18* | (2020.01) |

(52) U.S. Cl.
CPC ........ *G06F 30/398* (2020.01); *G06F 2119/18* (2020.01)

(58) Field of Classification Search
CPC ...... G06F 2119/12; G06F 30/20; G06F 30/33; G06F 30/00; G06F 30/394; G06F 2111/04; G06F 30/30; G03F 1/36; G03F 7/70591; G03F 7/70283; G03F 1/70; G03F 1/44; G03F 1/68; G03F 7/70466; G03F 7/70441; G03F 7/70433; G03F 1/38; G03F 7/70191; G03F 7/70991; G03F 7/70425; G03F 7/7055; G06T 11/001; H01L 21/67253
USPC .................................................. 716/50–56
See application file for complete search history.

(56) References Cited

U.S. PATENT DOCUMENTS

| | | | |
|---|---|---|---|
| 7,752,584 B2 | 7/2010 | Yang | |
| 7,784,018 B2 | 8/2010 | Melvin, III et al. | |
| 7,861,195 B2 | 12/2010 | Chan et al. | |
| 7,910,269 B2 | 3/2011 | Progler | |
| 8,020,120 B2 | 9/2011 | Heng et al. | |
| 8,141,008 B2 | 3/2012 | Zach | |
| 8,176,445 B1* | 5/2012 | Qian ....................... G06F 30/39 716/52 |
| 8,321,818 B2 | 11/2012 | Agarwal et al. | |
| 8,365,108 B2 | 1/2013 | Baum et al. | |
| 8,701,055 B1 | 4/2014 | Lee et al. | |
| 8,751,979 B1 | 6/2014 | Socha | |
| 8,799,830 B2 | 8/2014 | Robles | |
| 9,081,919 B2 | 7/2015 | Dai et al. | |
| 9,361,424 B2 | 6/2016 | Robles | |
| 9,651,856 B2 | 5/2017 | Inoue et al. | |
| 10,394,116 B2* | 8/2019 | Lin ........................... G03F 1/38 |
| 10,585,346 B2* | 3/2020 | Lin ........................... G03F 1/70 |
| 2005/0132306 A1* | 6/2005 | Smith ................... G06F 30/39 716/114 |
| 2005/0149902 A1 | 7/2005 | Shi | |
| 2005/0193363 A1 | 9/2005 | Gupta et al. | |
| 2005/0210437 A1 | 9/2005 | Shi | |
| 2005/0251771 A1* | 11/2005 | Robles ................. G06F 30/367 716/52 |
| 2006/0218516 A1 | 9/2006 | McLain et al. | |
| 2010/0203430 A1* | 8/2010 | Ye ....................... G03F 7/70433 430/5 |
| 2011/0099526 A1 | 4/2011 | Liu | |
| 2011/0173577 A1 | 7/2011 | Chuang et al. | |
| 2013/0139116 A1 | 5/2013 | Chow | |
| 2015/0089459 A1 | 3/2015 | Liu | |
| 2015/0339426 A1 | 11/2015 | Nifong et al. | |
| 2016/0378902 A1 | 12/2016 | Graur | |
| 2019/0072845 A1 | 3/2019 | Lin et al. | |
| 2019/0072846 A1 | 3/2019 | Lin et al. | |

OTHER PUBLICATIONS

Kim et al., "Model-based Hot Spot Fixing by using Target Point Control Function," Proc. SPIE 9426, Optical Microlithography XXVIII; 94261X, Mar. 18, 2015, pp. 1-7.

List of IBM Patents or Patent Applications Treated as Related; (Appendix P), Date Filed Jun. 17, 2019; 2 pages.

Yang et al., "A Kernel-Based DfM model for Process from Layout toWwafer," Proc. SPIE 7641, Design for Manufacturability through Design-Process Integration IV, 76410O, Apr. 2, 2010, pp. 1-8.

Yang et al., "OPC Solution by Implementing Fast Converging Methodology," Proc. SPIE 9426, Optical Microlithography XXVIII, 94261V Mar. 18, 2015, pp. 1-8.

Jinning Liu et al., "Incorporation of Process Variation Contours in Design Rule and Risk Estimation Aspects of Design for Manufacturability to Increase Fabrication Yield", U.S. Appl. No. 15/949,861, filed Apr. 10, 2018.

* cited by examiner

SEMICONDUCTOR FABRICATION DESIGN RULE LOOPHOLE CHECKING FOR DESIGN FOR MANUFACTURABILITY OPTIMIZATION

DOMESTIC PRIORITY

This application is a continuation of U.S. application Ser. No. 15/696,505, titled "SEMICONDUCTOR FABRICATION DESIGN RULE LOOPHOLE CHECKING FOR DESIGN FOR MANUFACTURABILITY OPTIMIZATION" filed Sep. 6, 2017, the contents of which are incorporated by reference herein in its entirety.

BACKGROUND

The present application generally relates to the manufacture of integrated circuits and to lithographic methods for manufacturing integrated circuit on a wafer. More particularly, the present invention relates to the design and manufacture of lithographic masks for the manufacture of integrated circuits and a method for optimizing the mask design for manufacturability.

Integrated circuits are typically fabricated by optical lithographic techniques, where energy beams transmit integrated circuit images or patterns on photomasks (equivalently, masks or reticles) to photosensitive resists on semiconductor wafer substrates, formed (equivalently, printed or transferred) as multiple layers of patterned materials overlaid on the substrate. For each patterned layer formed on the substrate, there may be one or more masks used to form the printed patterns on the wafer. The patterns are typically expressed as polygons on the masks. However, the polygons of the mask transferred to or imaged on the wafer will be smoothed and distorted during the lithographic process of transferring the mask patterns to the wafer, due to a variety of optical effects, as is well-known in the art. Thus, it is desirable that the circuit designers take into account the characteristics of the lithographic process, as well as functional and performance requirements while designing the circuit layout.

SUMMARY

According to one or more embodiments, a computer implemented method for fabricating a wafer, the method includes generating, by a processor, a process assumption band for an element of the wafer, the process assumption band depicting a shape of the element based on a set of process variations in a photolithographic process used for fabricating the wafer. The computer implemented method also includes generating, by the processor, a process variation band for the element of the wafer based on optical process correction simulation of the photolithographic process using design rules associated with the wafer. The computer implemented method also includes determining, by the processor, a deviation between the process assumption band and the process variation band. The computer implemented method also includes recalculating, by the processor, one or more design rules from the design rules associated with the wafer based on the deviation. The computer implemented method also includes updating, by the processor, the design of the wafer in response to the process variation band not being changeable to match the process assumption band.

According to one or more embodiments, a system for optimizing fabrication of a wafer includes a memory, and a processor coupled with the memory. The processor generates a process assumption band for an element of the wafer. The process assumption band depicts a shape of the element based on a set of process variations in a photolithographic process used for fabricating the wafer. The processor also generates a process variation band for the element of the wafer based on optical process correction simulation of the photolithographic process using design rules associated with the wafer. The processor also determines a deviation between the process assumption band and the process variation band. The processor also recalculates one or more design rules from the design rules associated with the wafer based on the deviation. The processor also updates the design of the wafer in response to the process variation band not being changeable to match the process assumption band.

According to one or more embodiments, a computer program product for optimizing fabrication of a wafer includes a computer readable storage medium. The computer readable storage medium includes computer executable instructions to generate a process assumption band for an element of the wafer. The process assumption band depicting a shape of the element based on a set of process variations in a photolithographic process used for fabricating the wafer. The computer storage medium also includes instructions to generate a process variation band for the element of the wafer based on optical process correction simulation of the photolithographic process using design rules associated with the wafer. The computer storage medium also includes instructions to determine a deviation between the process assumption band and the process variation band. The computer storage medium also includes instructions to recalculate one or more design rules from the design rules associated with the wafer based on the deviation. The computer storage medium also includes instructions to update the design of the wafer in response to the process variation band not being changeable to match the process assumption band.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

Figure 1A:
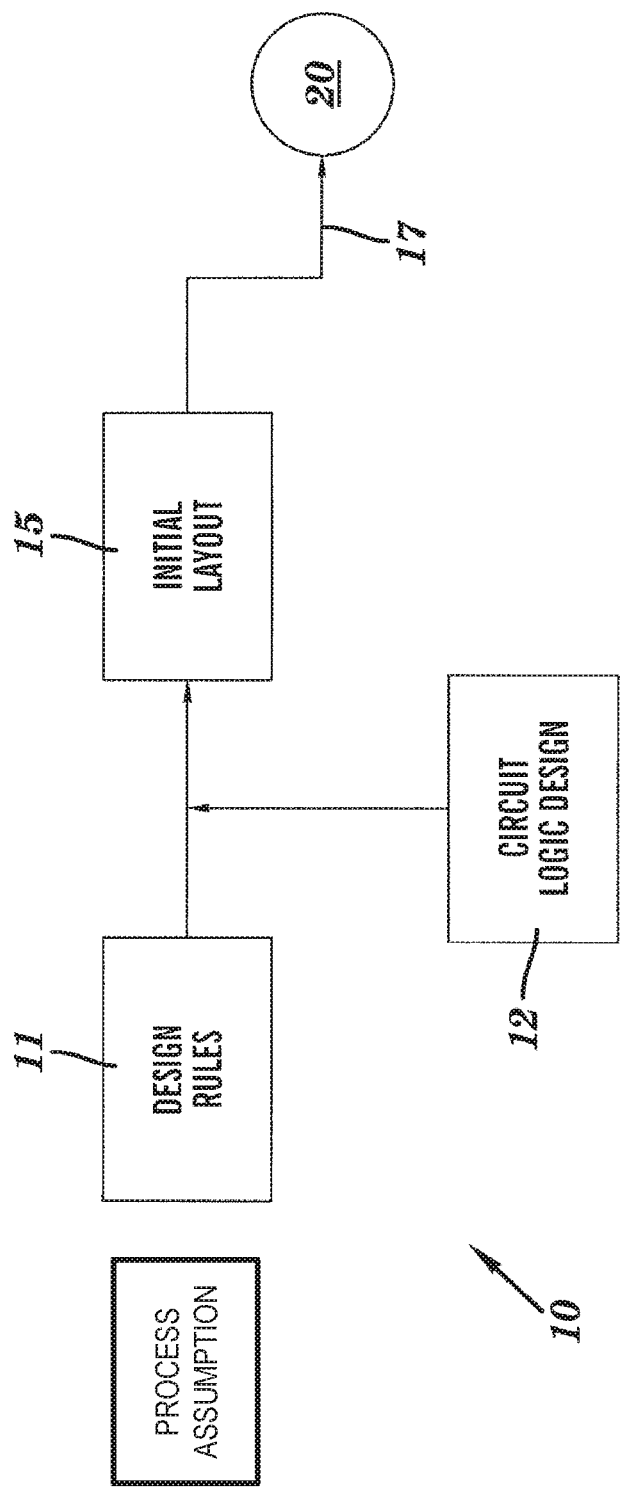
FIG. 1A illustrates a design flow, according to one or more embodiments.

Described here are technical solutions for optimizing designing and/or fabricating a wafer/integrated circuit (IC). Typically, during the process it is ensured that a target shape, or a design, or a layout of the wafer is compliant with design rules (or ground rules). In one or more examples, the compliance is checked by running Design Rule Check (DRC), which is a computer program that uses one or more design rules. Design rules are created based on failures on wafer that are caused during a manufacturing phase or later when the chip is being used. The process variations are determined considering predicted process variations in the manufacturing, which may be identified during process control. Typically, passing the DRC is the required, and only required, step for foundry to accept a design. In other words, a design passing DRC is deemed safe for a manufacturer to ensure certain yield. However, unpredicted variations are caused by effects during patterning phase of the wafer, in case operations during the patterning violate the process assumptions based on which design rules were made.

In one or more examples, the technical solutions facilitate comparing the target shape and process variation bands that are generated from the design rules during optical proximity correction phases of the wafer designing/fabrication process. Accordingly, a deviation between the assumed variations (PA 19) and actual variations is identified as a potential risk that can lead to an issue with the circuit in the future. A change in the design, after the circuit is manufactured may fix the future issue. Such changes are expensive from a perspective of time and other resources. However, a deviation in the process assumptions and the process variation bands may not be a true risk, as described herein. Thus, identifying the true risks and updating the design only in case of such 'true risks' before wafer manufacturing can save time and resources. Further, on the flip side, even if the target shape complies with the design rules based on the process variation bands, a potential hidden issue, also referred to as long term issues, may go undetected during the designing process. Instead, the hidden issue may be identified after the wafer has been fabricated, and placed for operation in a product. Thus, identifying such hidden issues in the designing phase can save expenses and resources.

The technical features described herein address such technical problems. The embodiments implementing the technical solutions described herein facilitate accessing process assumptions and generating process assumption bands that depict contours of variations of the manufacturing process. The embodiments further facilitate comparing the process assumption bands with process variation bands. The process assumption bands and the process variation bands are compared in relation to the target shape of the wafer. Based on the comparison, deviations between the process variation bands and the process assumption bands are identified and analyzed. In one or more examples, based on the type of the deviations identified, the technical features determine if the deviation represents a true risk. Accordingly, only if the deviation between the process assumptions band and the process variations bands represents a true risk, a notification is sent for updating the design shape, and thus a layout of the wafer. In one or more examples, the technical features notify where (location in the design) to re-calculate which design rule, and if the calculation based on PV band shows that the deviation is a true risk, then the design modification notification is sent, identifying the location and design rule. Thus, the technical features facilitate identifying true risks in the design, even before the design results in a fabricated wafer.

During design and manufacturing of integrated circuits (IC), design rules (DR) specify geometric constraints on layout artwork of a design of an integrated circuit (IC), and provide a communication channel between integrated circuit (IC) designers and fabrication process engineers. The objectives of the design rules include obtaining a circuit with optimum yield, minimizing the area of the IC, and providing long-term reliability of the IC. Design rules represent a compromise between performance and yield. In general, more conservative design rules increase yield, and more aggressive design rules increase performance.

Design Rule Checking (DRC) is the area of Electronic Design Automation (EDA) that determines whether the physical layout of a particular chip layout satisfies a series of recommended parameters that form the design rules or ground rules. DRC is a major step during physical verification signoff on the design, which also involves Layout versus schematic (LVS) checks, exclusive OR (XOR) checks, Electrical Rule Checks (ERC) and Antenna Checks. For advanced processes, some fabricators also insist upon the use of more restricted rules to improve yield. Design rules are maintained and released by a semiconductor foundry for its customers (layout designers of integrated circuits) to follow.

One or more of the design rules dictate the design of integrated circuits. Design rules are maintained and released by a semiconductor foundry for its customers (layout designers of integrated circuits) to follow. Conventionally, restrictive design rules (RDRs) are used, which curtail some of the "freedom" layout designers have traditionally had with regular design rules in less advanced process technologies. To achieve and maintain an acceptable return on investment for its customers and by extension for itself, a foundry may adopt RDRs to ensure that the completed layout design of an integrated circuit is manufacturable with the desired yield in more advanced process technologies. Other design rules such as multiple patterning (or multi-patterning) may also be adopted for manufacturing ICs, such as for 10 nm, and/or 7 nm node semiconductor processes and beyond. The premise is that a single lithographic exposure may not be enough to provide sufficient resolution. Hence, additional exposures may be needed, or else positioning patterns using etched feature sidewalls (using spacers) would be necessary.

Design Arc is a collection of design rules and the sum of design arc is referred to as the critical pitch. The critical pitch is a fixed and predetermined length. When the design arc is involved, the design space becomes discretized, which makes it very difficult to resolve design rules violations. In one or more examples, it is very difficult, if not impossible to resolve all the design rule conflicts. For example, edges are shared by multiple design rules from the design arc. When the designer attempts to fix or resolve one design rule violation, he/she may cause a chain reaction that more design rule violations result.

Figure 1B:
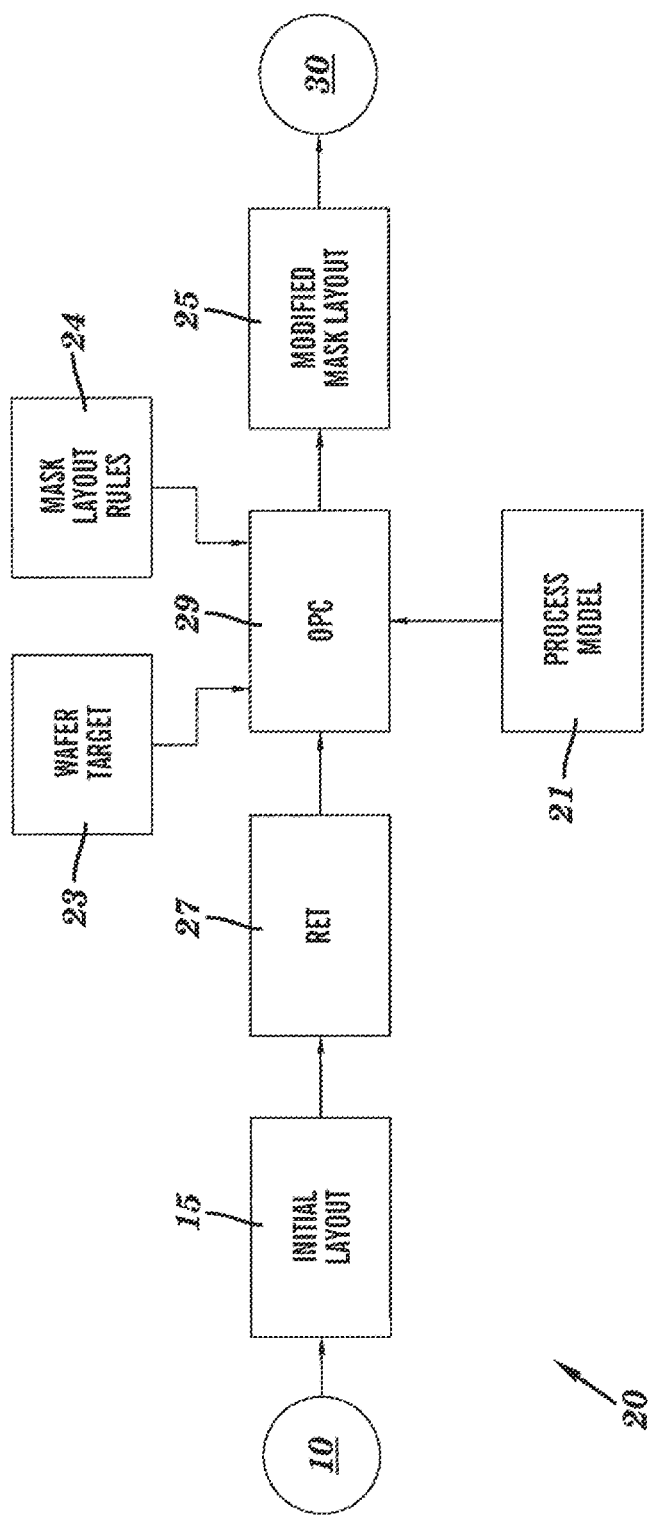
FIG. 1B illustrates a flow chart of a data prep process, according to one or more embodiments.
Figure 1C:
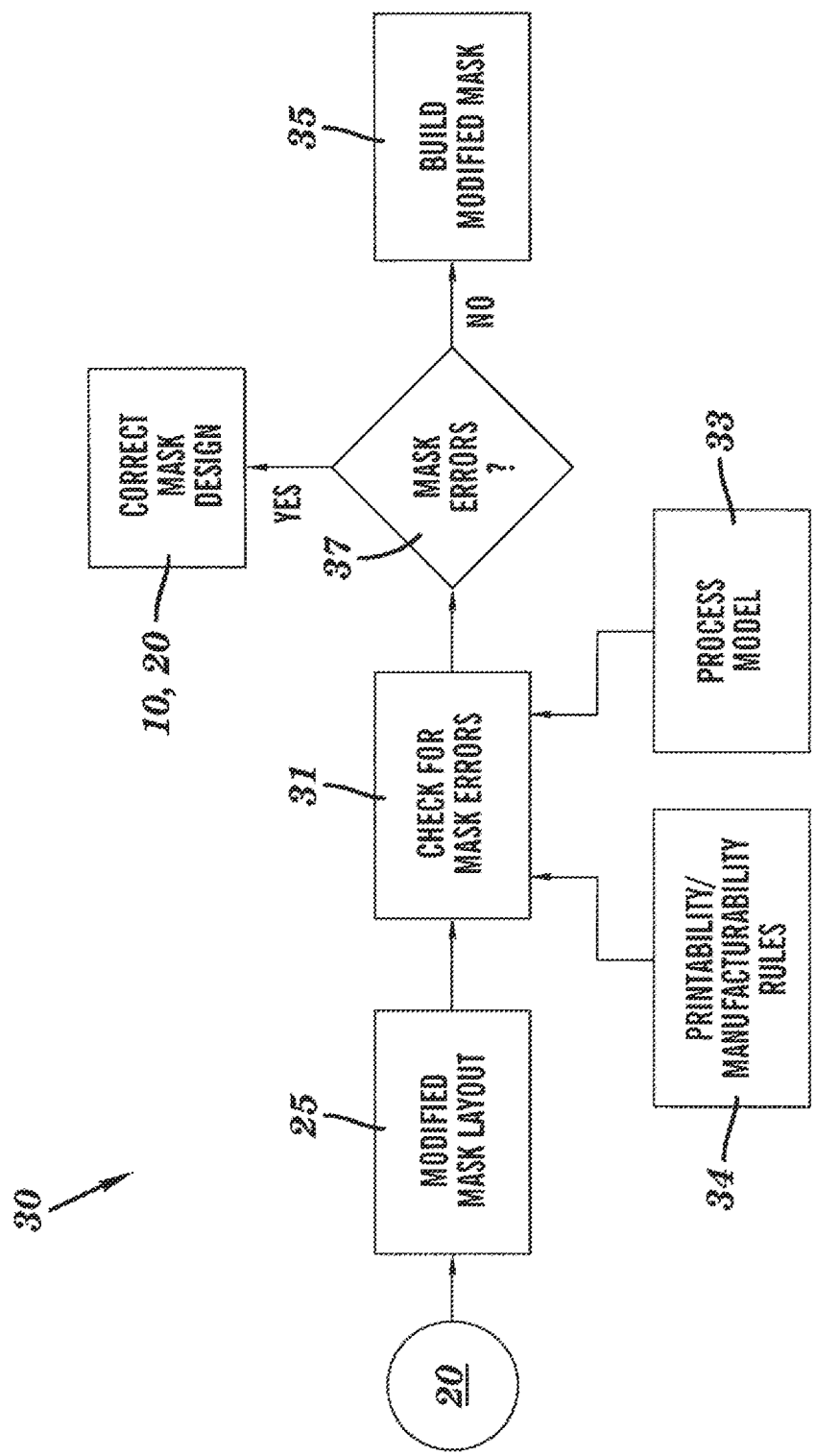
FIG. 1C illustrates a flow chart of a mask verification process.

The process of manufacturing an integrated circuit using a lithographic process can be generally understood with reference to FIGS. 1A-1C.

Referring to FIG. 1A, during a circuit design process flow 10, a circuit designer will incorporate a set of design rules 11 for preparing polygons for the initial mask layout 15 that correspond to a desired circuit layout level. The rules 11 may be expressed as, for example, as look-up tables of two-dimensional criteria, and may include criteria related to requirements such as overlay tolerance, critical dimension (CD), the minimum and maximum spacing between polygon shapes, etc. Optionally, the rules may be expressed in terms of tolerance bands around the desired design shapes. In one or more examples, the design rules regulate how designers draw layout (that is the design) of the circuit. For example, the design rules are automatically calculated by a system upon receiving the process assumptions in electronic format. The designer combines the requirements of the circuit logic 12 with the design rules 11, to arrive at an initial circuit layout 15, which typically includes a two-dimensional layout of polygon shapes.

The design rules 11 are generated based on Process Assumption 19 (PA). Process assumption 19 represents technology flows including predicted/assumed process variations of the technology target for the circuit. Accordingly, at least a subset of the design rules 11 for the circuit that are used for a design rules check are calculated based on the process assumptions 19. For example, the process assumptions 19 provides process step flow, overlay, final dimensions on the wafer, tolerance of dimensions (4 sigma value), like CDU, CRR, LER, and other such design intent and/or goals. When one or more specifications from the process assumptions 19 is not met, typically a defect/deficiency results during wafer fabrication. Alternatively, or in addition, by not meeting the one or more specifications from the process assumptions, a hidden defect may be introduced in the wafer, which leads to a reduced performance/reliability of the circuit. In one or more examples, the PA 19 are provided in an electronic tabulated form, or as any other data structure that the system 100 parses to compute the design rules 11.

Accordingly, it is critical that the wafer meets the specifications from the process assumptions 19. However, comparing a wafer after manufacturing with the process assumptions 19 is expensive, because, for example, Critical Dimension Uniformity (CDU) is 3-sigma variation of every design. Further, such comparison after the wafer is fabricated is too late in the design process, causing designers and foundry time and resources.

The design rules 11 typically include tolerances and constraints and other criteria related to performance and electrical characteristics of circuit devices, as well as manufacturability rules, such as for example, related to lithographic processes and overlay tolerances. An initial mask layout is typically assigned the same polygon layout as provided by the circuit layout 15. Typically, the initial mask layout 15 is written out as a data set which is provided as input to the lithographers, for example, at the foundry or FAB. The process of writing out the mask layout data set is often referred to as tapeout 17, and the tapeout data set may be sent to the foundry as input to further analysis and modification 20 by the foundry lithographic engineers. The tapeout dataset includes the circuit logic design 12, and the initial layout 15.

The circuit image on the photomask may not be reproduced precisely on the substrate, in part because of optical effects among transmitted and blocked energy passing through the photomask. Referring to FIG. 1B, prior to manufacturing the mask, the initial design layout 15 is typically modified to account for such optical effects. The process 20 of modifying the initial mask design 15 to form an actual, modified, mask layout 25 may include modifications by optical proximity correction (OPC) 29 and may optionally include resolution enhancement techniques (RET) 27. The process of modifying the mask layout is commonly referred to as data preparation (equivalently, "Data-Prep") 20. Optical Proximity Correction (OPC) 29 has been employed as a key enabling resolution enhancement technique required to meet image size control requirements imposed by state-of-the-art integrated circuit product programs. OPC 29 is the deliberate and proactive distortion of photomask patterns to compensate for systematic and stable errors. OPC is generally categorized as either rules-based or model-based. Rules-based OPC is done by determining the correctable imaging errors, calculating appropriate photomask compensations, and finally applying the calculated corrections directly to the photomask layout.

Model-based OPC (MBOPC) is based on the concept of capturing the imaging characteristics in a mathematical model 21 that represents the lithographic process, and calculating the expected on-wafer circuit image, which is projected by the mask pattern under investigation, comparing the simulated image contour placement to the edge placement of the original mask pattern, and iteratively adjusting the mask patterns until a suitable match of the simulated image to the desired on-wafer target pattern 23, within specified tolerances and other mask layout rules 24, is obtained. The mask layout rules 24 may include manufacturability rules that relate to mask house requirements, which may typically not be applied during the design of the circuit layout (e.g. FIG. 1A). Typically, the on-wafer target pattern 23 has the same layout of polygons as the initial design layout 15, which represents what the designer intends to be printed on the wafer. While MBOPC results in greater fidelity in the printed image, the use of MBOPC requires significantly more computational resource than rules-based OPC.

OPC keyword includes the rules or the models that are employed to correct mask shapes. For example, during the OPC phase, the process variation bands are generated based on an iterative evaluation of placements of edges of the design for optimal placement of the edges. For example, variations can occur in the focus of the image on the wafer, the dose of illumination light through the mask or reticle, the placement of a stepper, as well as other process conditions that affect how the circuit will be created on the wafer because of variations in the photolithographic processing. OPC facilitates creating models for objects to be created on the wafer, by determining ranges in the way the objects would be printed on the wafer under a variety of process conditions. The ranges are stored as the process variation bands (PV bands) that specify the smallest and largest dimensions of an object that may be expected to print on a wafer.

For example, a PV band includes an inner edge that defines the expected minimum area an object will occupy on a wafer when printed under all process conditions. The PV band also includes an outer edge that defines the maximum size that may be occupied by the objects when printed under some process conditions. The space between the inner edge and the outer edge defines a zone of uncertainty where the edges of the objects may be printed depending upon process conditions. In one or more examples, a PV band may lack an inner edge if, under certain process conditions, an object will not print at all. In one or more examples, the PV-bands are calculated by computing a number of silicon images of the objects under a number of process conditions.

The process variations may affect the position of a printed edge, the slope of the edge density, or a number of other factors that can be used to predict the final edge placement of the objects on the wafer. In one embodiment, aerial images are calculated at the nominal condition of the process, as well as at several sample points around the nominal. Those points are typically supplied by a user who is familiar with actual process variations.

Typically, optical lithographic tools employ laser illumination, such as at 193 nm wavelengths. For a given wavelength of illumination energy, the resolution of the lithographic process, or, in other words, the smallest dimension $\rho$ that can be reliably imaged, is typically expressed by the Rayleigh scaling equation $\rho = k/\lambda$ NA, where $\lambda$ is the wavelength of the source light, NA (numerical aperture) is a measure of the amount of light that can be collected by the lens, and the so-called k-factor k represents aspects of the lithographic process other than wavelength or numerical apertures, such as resist properties or the use of enhanced masks. Typical k-factor values range from about 0.7 to 0.4. However, by using a variety of resolution enhancement technologies (RETs) such as sub-resolution assist features (SRAFs), alternating phase-shift masks (altPSM), the k-factor may be reduced to improve the resolution of the lithographic process. For example, when RET is used along with, and in addition to MBOPC, existing optical lithographic tools can being used to print feature sizes, from 90 nm to 45 nm or smaller.

Thus, model-based OPC 29, along with RET 27, uses five primary polygon data sets. 1) An initial mask layout 15, which is used as input to MBOPC, which typically includes a polygon rendering of the circuit design 15 as laid out by the designers. 2) An RET layout, which is the initial input mask layout modified by the resolution enhancement techniques (RET) 27, such as assist features or alternating phase shapes. 3) A wafer target 23, which describes the desired on-wafer polygons, i.e. what is needed on the wafer to get the desired yield. Typically, the wafer target 23 is equivalent in layout to the initial mask or circuit design layout 15. 4) Simulated contours 21, which are the predicted on-wafer polygons generated by convolving the mask layout with a mathematical model of the imaging process. 5) The modified or interim mask layout 25, which is the output of an OPC iteration that describes the polygons to be placed on the photomask.

Further, the model-based OPC is an iterative optimization process that includes generating simulated contours of the initial mask layout 15, typically modified to form a RET layout. The MBOPC further includes comparing the simulated contours to the wafer target 23. The MBOPC further includes adjusting the RET layout to compensate for offsets between the simulated contour 21 and the wafer target 23—thereby generating the first estimate of the mask layout 25. The MBOPC further includes repeating this process using the interim mask layout 25 from one iteration as the input for the next iteration.

This cycle is repeated until the offset between the simulated contour and the wafer target 23 is at an acceptable value, or until a maximum number of iterations is exhausted. The output of the final iteration becomes the actual mask layout 25 which is sent to the maskhouse.

A commonly applied simplification is that the initial input mask layout 15 is assumed to be equal to the wafer target 23. The modified mask layout 25 may then be sent to a mask house and/or to the foundry or FAB, for fabrication. For example, the modified mask layout 25 may be transmitted electronically, or stored in electronic form in a manner that is accessible by the foundry.

However, referring to FIG. 1C, before the mask is built, the modified mask layout 25 typically undergoes a further verification procedure 30, which verifies the mask manufacturability according to the requirements and capabilities of the mask house, and printability of the mask based on the detailed lithographic process of the specific FAB where the integrated circuit will be manufactured. The modified mask layout 25 is checked for errors (Block 31) according to manufacturability and printability criteria that may be provided in a variety of forms, such as a detailed process model 33 and manufacturability and/or printability rules 34 provided by the FAB, and/or the mask house. In one or more examples, such rules may be accessed electronically via a database. The modified mask layout 25 is examined for violations of the rules or for printability errors that may unacceptably increase the risk of yield failures for the specific lithographic process to be used. If the modified mask 25 passes the printability and manufacturability criteria (i.e., no errors are found in Block 37), then the mask may be built (Block 35). However, if mask errors are found, then the mask may have to be further modified as in the data prep procedure 20 of FIG. 1B, or possibly re-designed, as in procedure 10 of FIG. 1A.

Figure 2:
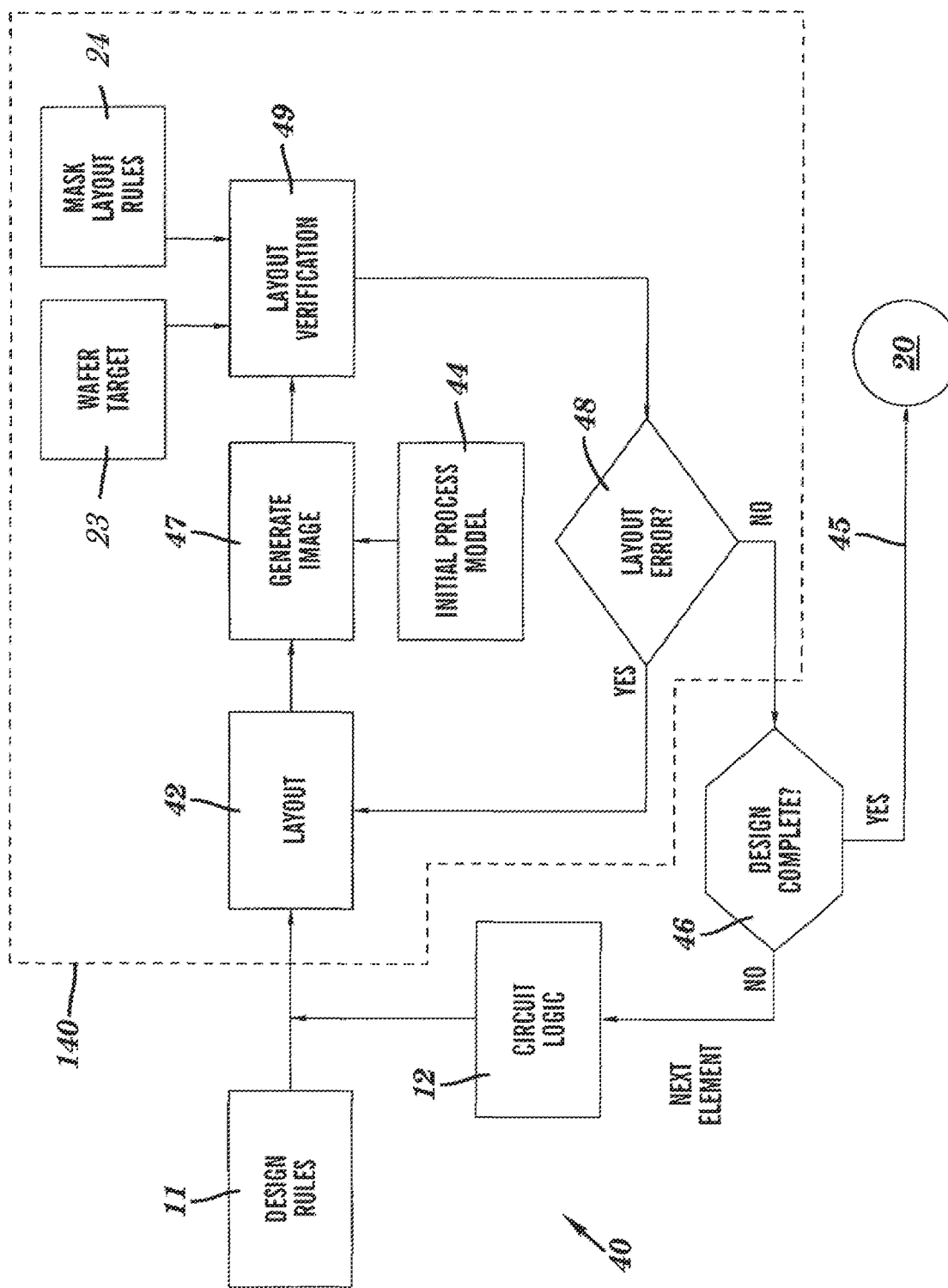
FIG. 2 illustrates a DFM flow, according to one or more embodiments.

Alternatively, the mask layout may be designed to ensure manufacturability and printability at the design stage itself. Referring to FIG. 2, this procedure, so-called design for manufacturing (DFM) 40, is a modification of the basic design flow 10 of FIG. 1A. Design rules 11 and circuit logic 12 are provided as input, as in a basic design flow 10 (see FIG. 1A), but the resulting mask layout 42, which may include RET shapes, is modified by a model-based layout optimization procedure 140. The model-based modification 140 method includes accessing, as input, the wafer target 23, along with specified tolerances and mask layout rules 24. Further, using an initial process model 44, the model-based modification 140 includes simulating an image 47 using the process model 44. As described herein, the wafer target 23 often has the same polygon layout as the initial circuit or mask design layout 15. The simulated contours are presented to the designers, thereby enabling them to adjust their layout shapes to obtain more favorable wafer shapes. This may be done, for example, by applying the RET to the layout 42 at hand, running OPC, and then using a process model 44, such as a process window model (i.e. a model aware of process variations) to generate contour bands to present to the designer. Alternatively, the process model 44 may comprise a compact model, which, with reasonable accuracy, which describes the entire sequence of shape transforms from input layout, RET layout, mask layout, to simulated contour band. In most cases, the generated contours are evaluated for dimensional failures, i.e. layout verification 49, similar to the mask verification 30 (FIG. 1C), and error markers are presented to the designers to prompt a layout modification. If no errors are found (no errors in Block 48), then tapeout 45 of the modified layout may be performed and the dataset comprising the modified layout is then sent forward to the foundry and enters the data prep cycle 20 (FIG. 1B) as the input, initial mask layout 15 (FIG. 1B). Thus, desirably, the output of model-based layout optimization 140 that is sent to the foundry's RET/OPC analysis 20 exhibits fewer or no printability or manufacturability errors.

However, some drawbacks to this approach include, first, that the development of lithographic and wafer etch processes and chip designs typically occurs concurrently over periods from about 6 months at minimum to 5 years or more. This development time frame makes it practically impossible to give designers accurate descriptions of the RET and OPC solutions as well as accurate process window models during the design of the chip. Having designers optimize layouts to inaccurate models of the RET/OPC solutions while they are operating under the assumption that they have accurate insight into the patterning process can lead to catastrophic failures and would make manufacturability worst, not better.

Secondly, the primary customers for model-based layout optimization are fabless design houses, which design chips to be manufactured at outside foundries. A key requirement for these fabless design houses is to maintain foundry portability (i.e. the ability to move their business from one foundry to a competing one) or even to outsource their product to multiple foundries at the same time. The success of model-based layout optimization is based on a detailed, accurate model of a particular foundry's RET/OPC and imaging solution, and thus fundamentally links the optimized layout to a specific foundry. Thus, performing a model-based layout optimization using the detailed process model for each individual foundry would be impractical. An alternative solution of using a 'least common denominator' model that describes the worst case printability failures for multiple foundries would be extremely conservative and would yield noncompetitive layout densities, which is of particular importance for multiple foundries collaborating or competing for fabless business.

Further, when a designer manipulates the original layout based on simulation feedback, he/she is effectively introducing a new polygon set, i.e. the optimized layout no longer represents the original designer's intent, rather it represents what the designer had to do to the original intended layout to make it pass the model-based optimization. If this manipulated layout is introduced as the input layout to the RET/OPC flow the added polygon complexity and uncertainty over designer's intent, will introduce manufacturability risk and could have the exact opposite effect of what DFM is intending to achieve.

Further yet, the DRC uses the ground rules for determining 'correctness' of the ICs and/or the wafers. The ground rules are based on Process Assumption (PA), and checking/ monitoring the PA poses further technical challenges in addition to those listed above. The current DFM practice facilitates correcting, partially, any deficiencies after the wafer/IC is fabricated and deficiencies observed, not before.

Accordingly, the embodiments of technical solutions described herein address the aforementioned difficulties, and provides a mask design that minimizes or avoids printability and/or manufacturability errors during mask verification at multiple foundries, and provide an efficient design process that may be used during fab-less designing and manufacturing. In one or more examples, the embodiments of the technical solutions avoid deficiencies in the wafer before the wafer is fabricated by comparing OPC results with PA parameters. Further, based on the results of the comparison, the embodiments of the technical solutions facilitate identifying specific ground rules that require an additional inspection to ensure that the wafer matches the PA, and thus the designer's intent.

Figure 3:
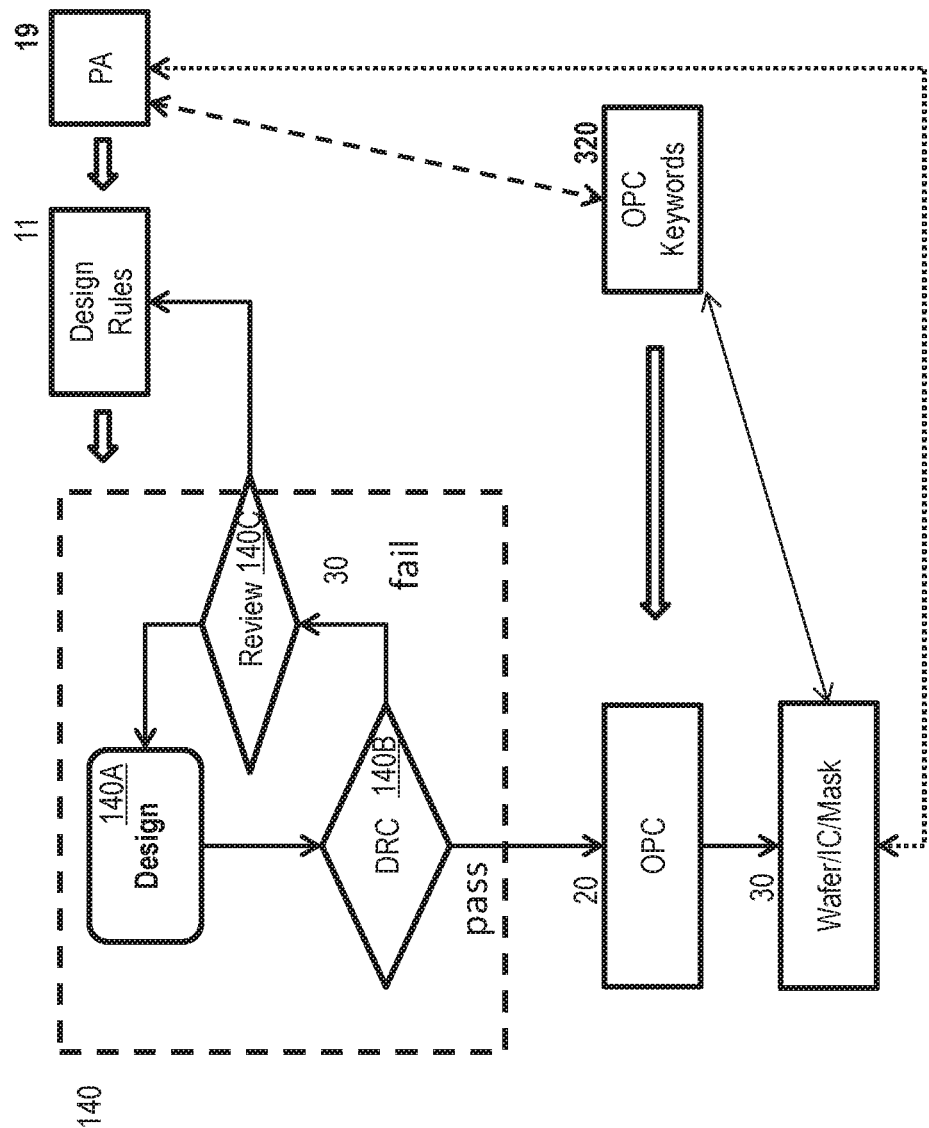
FIG. 3 illustrates a flowchart of an example overview of a wafer fabrication process, according to one or more embodiments.

Referring to FIG. 3, an overview of the IC manufacturing process starting from developers creating the PA 310 at the outset of the process is illustrated. The PA 19 are created well before OPC keywords 380 are generated. The design rules 11 are generated based on the PA 19. The DFM process 140 is performed in which the design rules are used to design the wafer, as shown at 140A. The design is checked by comparing with the DRC to ensure that the design meets thresholds, as shown at 140B. If the DRC fails, the design is reviewed, as shown at 140C. As described earlier, during the review, a modified design may be generated, or the design rules may be changed, as shown at 140C. Alternatively, if the DRC succeeds, the wafer design is passed through the OPC, as described earlier, such as at FIG. 1B. The OPC process generates one or more OPC keywords, as shown at 320. Typically, the OPC keywords mature at the end of the process, under constant update to match wafer results. In one or more examples, the OPC keywords are compared with design rules 11 to check if the design passed for fabricating the wafer matches the design rules 11. However, the PA 19 is not checked. If all different designs for the wafer, that is all the layout modifications match the PA 310, hidden defects, such as reduced performance/ reliability, as well as other defects during fabrication, are reduced. Instead, once the OPC keywords match with the design rules 11, the design is forwarded for manufacturing after mask verification, as described by FIG. 1C.

Figure 4:
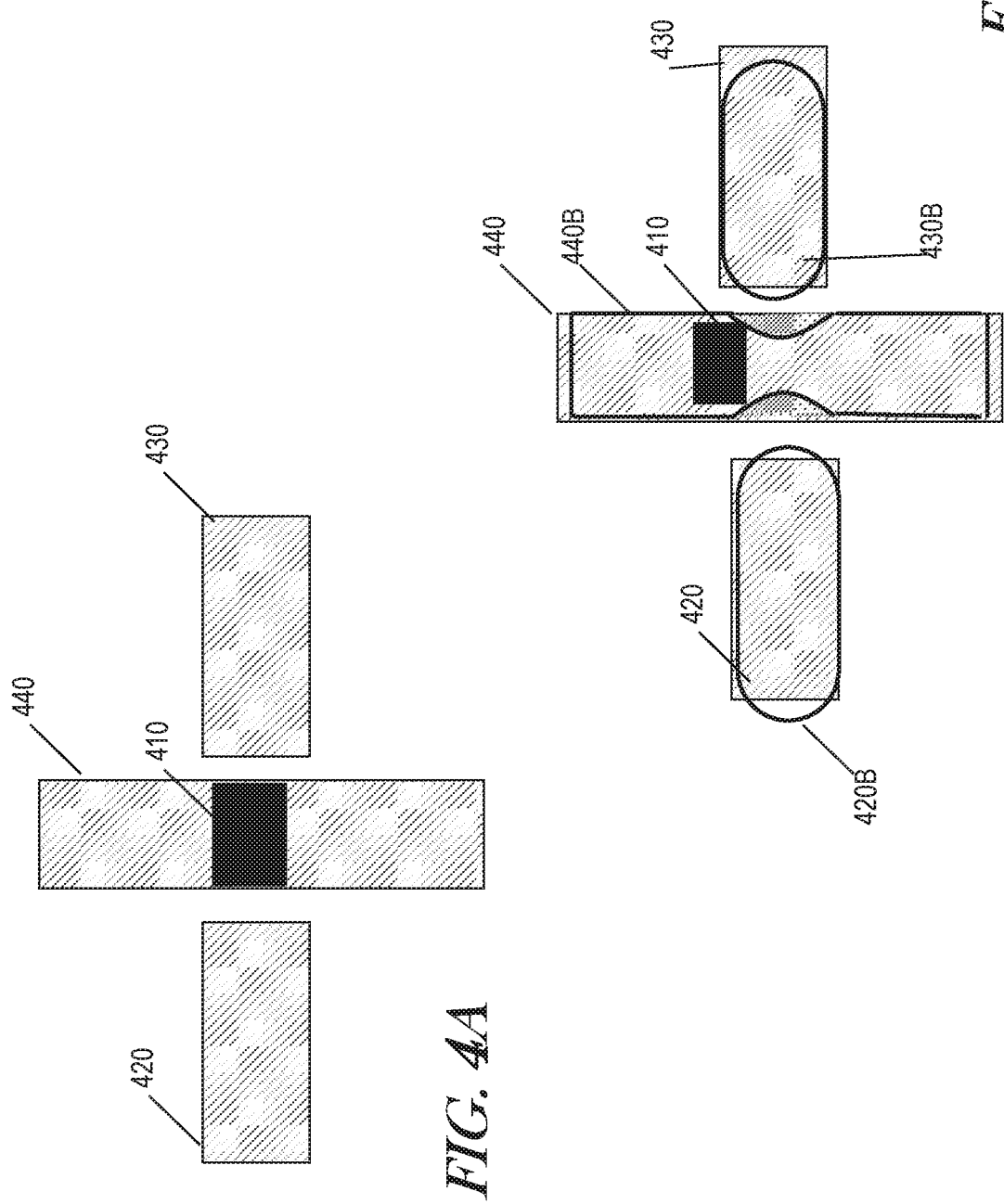
FIGS. 4A and 4B illustrate an example scenario in which even if a design passes DRC, the resulting wafer does not match process assumptions, according to one or more embodiments.

FIGS. 4A and 4B illustrate an example scenario in which even if a design passes DRC, the resulting wafer does not match the PA 19. In this case a victim-attacker scenario is illustrated as an example, however, it is understood that other cases may also exhibit the technical problem described herein, that even if a design passes DRC 140b, the resulting wafer 35 does not match the PA 310. FIG. 4A illustrates a top-view of a portion of the wafer, according to the PA 19, such that the portion includes a via 410 that, according to the PA 310, is at an intersection of element 420, element 430, and element 440. Further, the PA 310 specifies that the via 410 is to land on top of the element 440. However, as illustrated in FIG. 4B, in the victim-attacker example scenario depicted, during fabrication, the proximity of elements on the wafer leads to a reduction in width of an element (victim) significantly, in this case, the element 440. For example, the elements 420, 430, and 440, upon fabrication (that is in practice) may result as depicted by elements 420B, 430B, and 440B, respectively. As illustrated in FIG. 4B, the elements vary in shape, size, and location compared with the specifications from FIG. 4A. In one or more examples, the differences in the fabricated elements and the specifications according to the design rules 11, may meet the tolerances and other thresholds.

For example, the attacker elements, in this case, the element 420B and the element 430B, are said to pinch the victim, the element 440B. During DFM, even if the pinching is detected, as long as the elements can be printed, and are within the tolerances, the design rules 11 are considered to be matched, and thus, a design review may not be initiated in this case. Further yet, in this case, because of the reduction in the width of the element 440B, the landing area for the via 410 is reduced. This may, potentially, lead to higher resistance compared to if the victim-attacker defect was not present. Such a higher resistance may potentially be a hidden defect that may cause a reliability issue for the wafer at a future time.

Creating design rules 11 that detect such defects automatically is challenging. For example, in this case, the design rules 11 may have to consider combinations of victim width, attacker width, and gap sizes; and thus, creating design rules is difficult for all combinations.

Typically, DFM team address these difficulties by simulating the OPC, and checking/fixing intra-level printing deficiencies, such as bridging, line-end pull back, and others. However, inter-level deficiencies, which are deficiencies caused because of alignment (or misalignment) of fabricated elements on different levels of the wafer, may not be detected and addressed by such simulations. Accordingly, typically, the wafer is manually analyzed for detecting such hot-spots.

The technical solutions described herein facilitate such detection automatically, or semi-automatically. For example, a system implementing the technical solutions described herein facilitates identifying a location, levels, and nature of mismatch in the OPC simulation results and the design rules 11 to determine if the simulation results are compliant with the process assumptions 19. Further yet, the technical solutions facilitate identifying and notifying, for additional checking, locations on the wafer. For example, the locations may be hot-spots that are to be checked for particular process assumptions 19, even if the design rules 11 are satisfied. In one or more examples, additional checking of such locations may include manual inspection of such spots.

Figure 5:
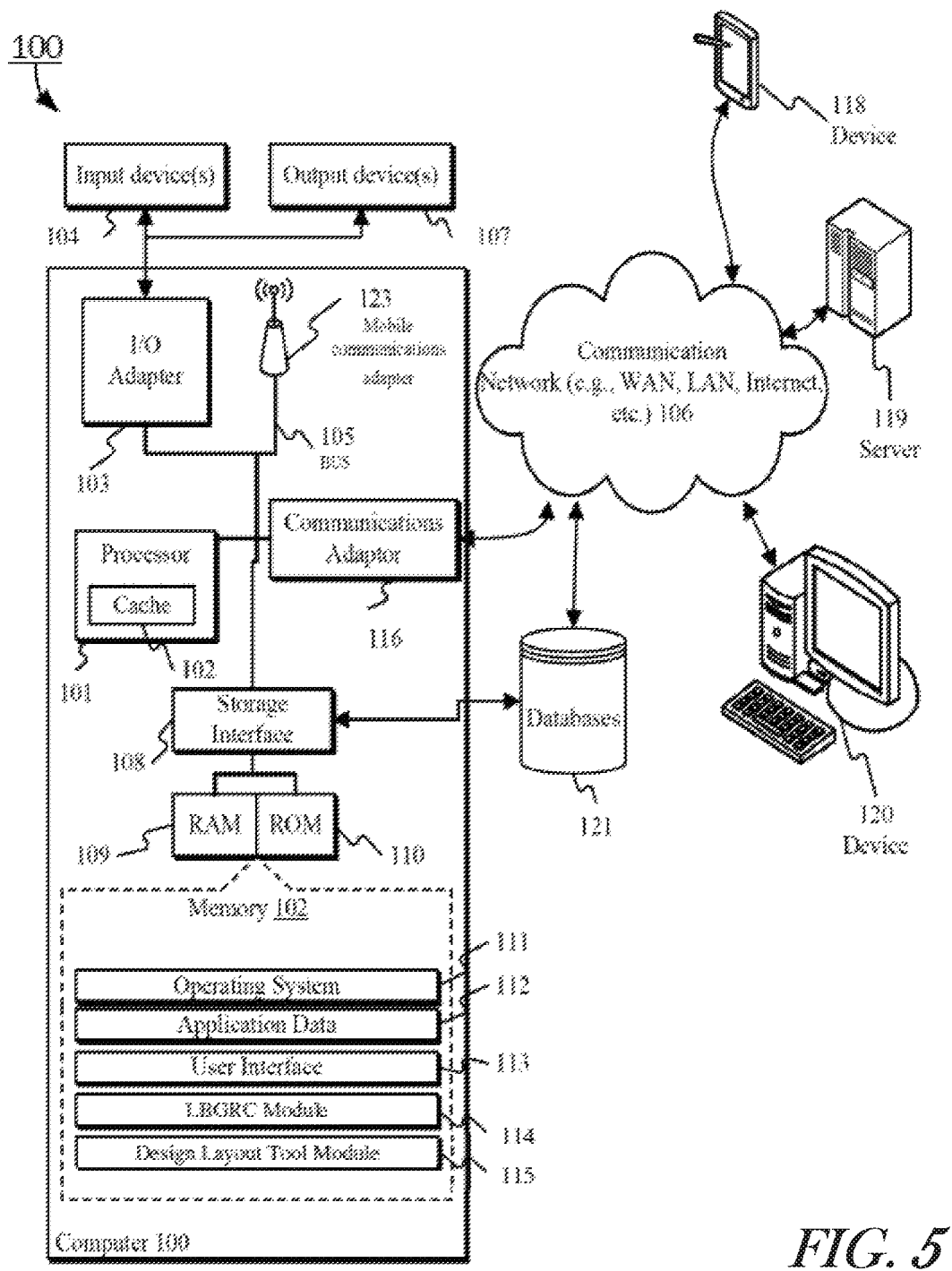
FIG. 5 illustrates a block diagram of an exemplary computing environment, according to one or more embodiments.

FIG. 5 illustrates a block diagram of an exemplary computing environment and computer system 100 (hereafter "computer 100") for use in practicing the embodiments described herein. The methods described herein can be implemented in hardware, software (e.g., firmware), or a combination thereof. In an exemplary embodiment, the methods described herein are implemented in hardware and may be part of the microprocessor of a special or general-purpose digital computer, such as a personal computer, workstation, minicomputer, or mainframe computer. Computer 100 therefore can embody a general-purpose computer. In another exemplary embodiment, the methods described herein are implemented as part of a mobile device, such as, for example, a mobile phone, a personal data assistant (PDA), a tablet computer, etc.

In an exemplary embodiment, in terms of hardware architecture, as shown in FIG. 5, the computer 100 includes processor 101. Computer 100 also includes memory 102 coupled to processor 101, and one or more input/output adapters 103 that may be communicatively coupled via system bus 105. Memory 102 may be operatively coupled to one or more internal or external memory devices via a storage interface 108. Communications adapter 116 may operatively connect computer 100 to one or more networks 106. System bus 105 may connect one or more user interfaces via input/output (I/O) adapter 103. I/O adapter 103 may connect multiple input devices 104 to computer 100. Input devices may include, for example, a keyboard, a mouse, a microphone, a sensor, etc. System bus 105 may also connect one or more output devices 107 via I/O adapter 103. Output device 107 may include, for example, a display, a speaker, a touchscreen, etc.

Processor 101 is a hardware device for executing hardware instructions or software, particularly that stored in a non-transitory computer-readable memory (e.g., memory 102). Processor 101 can be any custom made or commercially available processor, a central processing unit (CPU), one or more CPUs, for example, CPU 101A-101C, an auxiliary processor among several other processors associated with the computer 100, a semiconductor based microprocessor (in the form of a microchip or chip set), or generally any device for executing instructions. Processor 101 can include a cache memory 122, which may include, but is not limited to, an instruction cache to speed up executable instruction fetch, a data cache to speed up data fetch and store, and a translation lookaside buffer (TLB) used to speed up virtual-to-physical address translation for both executable instructions and data. Cache memory 122 may be organized as a hierarchy of more cache levels (L1, L2, etc.).

Processor 101 may be disposed in communication with one or more memory devices (e.g., RAM 109, ROM 110, one or more external databases 121, etc.) via a storage interface 108. Storage interface 108 may also connect to one or more memory devices including, without limitation, one or more databases 121, and/or one or more other memory drives (not shown) including, for example, a removable disc drive, etc., employing connection protocols such as serial advanced technology attachment (SATA), integrated drive electronics (IDE), IEEE-1394, universal serial bus (USB), fiber channel, small computer systems interface (SCSI), etc. The memory drives may be, for example, a drum, a magnetic disc drive, a magneto-optical drive, an optical drive, a redundant array of independent discs (RAID), a solid-state memory device, a solid-state drive, etc. Variations of memory devices may be used for implementing, for example, a gate model database 121 that stores one or more datasets of models of the gate configurations of various microprocessor designs.

Memory 102 can include random access memory (RAM) 109 and read only memory (ROM) 110. RAM 109 can be any one or combination of volatile memory elements (e.g., DRAM, SRAM, SDRAM, etc.). ROM 110 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 102 may incorporate electronic, magnetic, optical, and/or other types of non-transitory computer-readable storage media. Memory 102 may also be a distributed architecture, where various components are situated remote from one another, but can be accessed by processor 101.

The instructions in memory 102 may include one or more separate programs, each of which comprises an ordered listing of computer-executable instructions for implementing logical functions. In the example of FIG. 5, the instructions in memory 102 may include an operating system 111. Operating system 111 can control the execution of other computer programs and provides scheduling, input-output control, file and data management, memory management, and communication control and related services.

The instructions in memory 102 may further include application data 112, and a user interface 113.

Memory 102 may also include a layout based ground rule calculation (LBGRC) module 114, configured to receive a set of process assumptions and one or more failure mechanisms and perform layout based ground rule calculation. In certain embodiments, Memory 102 may also include a design layout tool module 115, configured to allow design layout engineers to manually and/or automatically create a design layout or make adjustment to an existing design layout based on results of the layout based ground rule calculation by the LBGRC module 114.

I/O adapter 103 can be, for example but not limited to, one or more buses or other wired or wireless connections. I/O adapter 103 may have additional elements (which are omitted for simplicity) such as controllers, microprocessors, buffers (caches), drivers, repeaters, and receivers, which may work in concert to enable communications. Further, I/O adapter 103 may facilitate address, control, and/or data connections to enable appropriate communications among the aforementioned components.

I/O adapter 103 can further include a display adapter coupled to one or more displays. I/O adapter 103 may be configured to operatively connect one or more input/output (I/O) devices 107 to computer 100. For example, I/O 103 may connect a keyboard and mouse, a touchscreen, a speaker, a haptic output device, or other output device. Output devices 107 may include but are not limited to a printer, a scanner, and/or the like. Other output devices may also be included, although not shown. Finally, the I/O devices connectable to I/O adapter 103 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

According to some embodiments, computer 100 may include a mobile communications adapter 123. Mobile communications adapter 123 may include GPS, cellular, mobile, and/or other communications protocols for wireless communication.

In some embodiments, computer 100 can further include a communications adapter 116 for coupling to a network 106.

Network 106 can be an IP-based network for communication between computer 100 and any external device. Network 106 transmits and receives data between computer 100 and devices and/or systems external to computer 100. In an exemplary embodiment, network 106 can be a managed IP network administered by a service provider. Network 106 may be a network internal to an aircraft, such as, for example, an avionics network, etc. Network 106 may be implemented in a wireless fashion, e.g., using wireless protocols and technologies, such as WiFi, WiMax, etc. Network 106 may also be a wired network, e.g., an Ethernet network, an ARINC 429 network, a controller area network (CAN), etc., having any wired connectivity including, e.g., an RS232 connection, R5422 connection, etc. Network 106 can also be a packet-switched network such as a local area network, wide area network, metropolitan area network, Internet network, or other similar type of network environment. The network 106 may be a fixed wireless network, a wireless local area network (LAN), a wireless wide area network (WAN) a personal area network (PAN), a virtual private network (VPN), intranet or other suitable network system.

Network 106 may operatively connect computer 100 to one or more devices including device 120. Network 106 may also connect computer 100 to one or more servers such as, for example, server 119.

If computer 100 is a PC, workstation, laptop, tablet computer and/or the like, the instructions in the memory 102 may further include a basic input output system (BIOS) (omitted for simplicity). The BIOS is a set of essential routines that initialize and test hardware at startup, start operating system 111, and support the transfer of data among the operatively connected hardware devices. The BIOS is stored in ROM 110 so that the BIOS can be executed when computer 100 is activated. When computer 100 is in operation, processor 101 may be configured to execute instructions stored within the memory 102, to communicate data to and from the memory 102, and to generally control operations of the computer 100 pursuant to the instructions.

Figure 6:
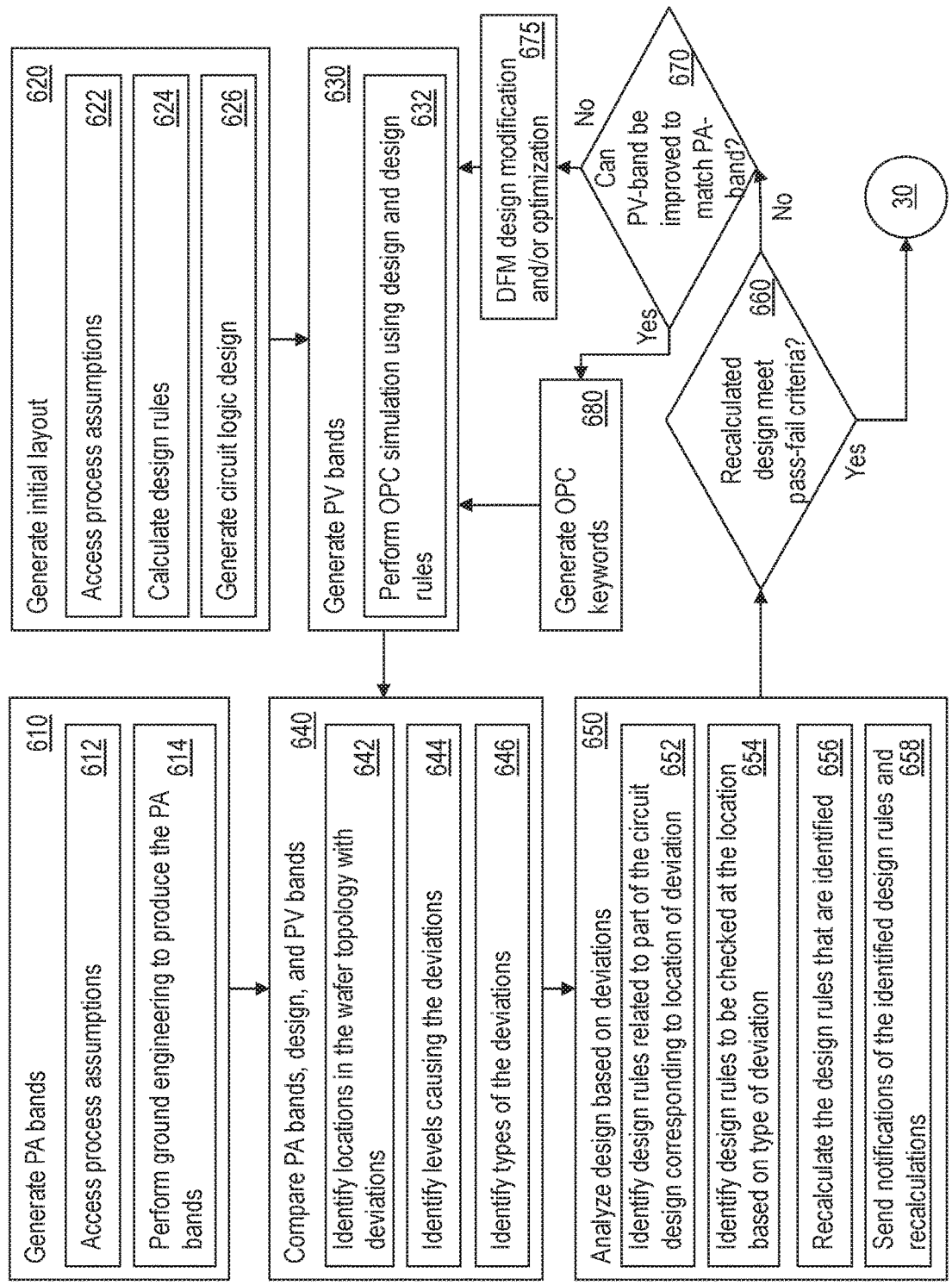
FIG. 6 illustrates an example method for optimizing fabrication and/or designing a wafer, according to one or more embodiments.

In one or more embodiments, the system 100 implements the one or more technical solutions described herein, such as be performing a method, and/or executing one or more computer executable instructions stored on computer readable non-transitory storage medium. FIG. 6 illustrates an example method implemented by the system 100 for optimizing fabrication and/or designing a wafer/IC in this regard. For example, the system 100 generates process assumption bands (PA bands), as shown at 610. The system 100 generates the PA bands by receiving/accessing the process assumptions 19, and performing ground engineering to generate the PA bands, as shown at 612 and 614.

In one or more examples, the system 100 accesses the process assumptions 19 from the one or more databases 121 in electronic format. Further, performing ground engineering may include inputting the process assumptions 19 into an automated tool that generates the PA bands according to the process assumptions 19. Process assumptions include design-to-wafer bias as well as dimension variations at the side and end of the shapes. Based on these values, a +3sigma outer and a −3sigma inner contour can be created from design shape that forms the PA band. The PA bands depict variations in the shapes of the elements of the wafer because of the process assumptions 19 associated with the wafer fabrication process.

In conjunction, the system 100 generates the initial layout 15 for the wafer, as shown at 620. As described herein (see FIG. 1A), generating the initial layout includes accessing the process assumptions 19, calculating the design rules 11 accordingly, and generating the initial layout 15 based on a circuit logic design 12 and the design rules 11, as shown at 622, 624, and 626.

The system 100 further generates process variation bands (PV bands) based on the initial design, as shown at 630. In one or more examples, the system 100 generates the PV bands by performing OPC simulation using OPC models calibrated with test wafer data for the generated design, as shown at 632. The PV bands simulate variation in attributes of elements, (length, widths, stack info) considering both the lithography and etch aspects of the systematic variations when the wafer is fabricated. The PV bands depict the shapes of the elements of the wafer upon fabrication based on a simulation of the system 100. In one or more examples, a PV band is a representation of the possible simulated contours obtained by the variations in the process parameters. Several contours combined together make a PV band. PV bands show how much and where a design will vary in response to process variations. Each PV band represents all possible printing locations resulting from one set of dose, focus, mask bias, resist, and etch variation conditions.

Thus, the system 100 generates three shapes for each element from the wafer—PA bands, PV bands, and circuit design. The system 100 compares the three shapes to detect differences in the three shapes, as shown at 640. Thus, instead of comparing design rules 11 with PV bands, the technical solutions described herein alternatively, or in addition, facilitate comparing the design, the PV bands, with the PA bands. The comparison facilitates the system to identify locations in the wafer topology that have deviations, as shown at 642. For example, the deviation includes mismatches between the PA bands and the PV bands. In one or more examples, the locations of deviations may be identified using 2D or 3D coordinates. Alternatively, or in addition, the system 100 identifies the locations on a graphical user interface (GUI), such as by highlighting the locations on the wafer topology via the GUI.

Further, based on the comparison, the system 100 identifies one or more design levels of the wafer topology in which the deviation occurred, as shown at 644. Because of the deviation, the design rules relevant to the design levels associated with the deviation may be at risk, even though the design in one or more of such design levels passes DRC. For example, the deviation includes a pair of levels of the wafer topology being closer to each other than a predetermined threshold. Alternatively, or in addition, the deviation may include a variation in a lower level of the wafer that may cause a next layer, that is the upper layer, to have a deviation, such as in the victim-attacker example where the via 410 had a lesser area to print because of the pinching. The system 100 accesses the design rule database and identifies, for further analysis, the design rules that are relevant to the design levels associated with the deviation.

Further yet, based on the comparison, the system 100 identifies types of the deviations detected, as shown at 646. For example, the different types of deviations may include different types of mismatches among the three shapes. For example, the types of mismatches include PV band being outside the PA band, the PA band being outside the PV band, and other such types. Based on the nature of the mismatch, system 100 further down-selects rules at risk from the design rules that were previously identified or selected for further analysis. The nature or type of the mismatch indicates if the intent of the rules, and/or process assumptions 19 is violated.

The system 100 analyzes the design based on the identified deviations between the PA band and the PV band, as shown at 650. In one or more examples, the system 100 determines where to re-calculate which design rule based on the analysis. For example, based on a location of the deviation in the PA band and the PV band, the system 100 identifies one or more design rules that are corresponding to the location of the deviation, as shown at 652. For example, the system 100 identifies one or more portions of the circuit design that is associated with the location at which the bands deviate. Further, the system 100 determines the design rules 11 that are associated with the one or more portions of the circuit design. The wafer may be at risk at the location of deviation depending on the nature/type of the deviation. Thus, the system 100 identifies a subset of the one or more design rules from the previously identified design rules for comparing with the identified locations of the design, to ensure compliance of the design with the process assumptions, as shown at 654.

The system 100 may further analyze the one or more portions of the circuit design and recalculate the associated design rules that are previously identified, as shown at 656. For example, the recalculation may include recalculating the tolerances, locations of edges, or other design rules. The recalculation is to check certain failure mode for which the design rule(s) was made. The recalculation uses the new tolerances and location of edges, which are different from the PA values.

In one or more examples, the system 100 sends notifications to a user regarding the identified design rules and the deviations, as shown at 658. For example, the system 100 notifies the user for further checking the design based on the updated design rules. In one or more examples, the notifications may include one or more messages with indications of the identified mismatches. For example, the notifications may be sent to one or more users, such as testing engineers, developers, and so on. Alternatively, or in addition, the notification may include highlighting the deviations in the GUI that illustrates the PA band and the PV band, for example overlaid on each other, side-by-side, or in any other visual manner. Alternatively, or in addition, the notification may include highlighting portions of the circuit design in the GUI. For example, the system 100 determines design rule modifications based on the type of the deviations identified, as shown at 654. In one or more examples, the recalculated design rules are compared to check if the results pass predetermined failure criteria, as shown at 660. For example, the failure criteria is based on defects/deficits during fabrication or usage of the chip, such as minimum contact area violation for reliability, minimum insulation violation, and the like. In other words, it is ensured that the recalculated design rules are met based on specified realistic process parameters, such as tolerances.

Further, the system 100 determines if the deviations represent a true risk based on the results from the recalculation of the design rules, such as a hidden issue by determining whether the design meets the process assumptions 19.

Figure 7:
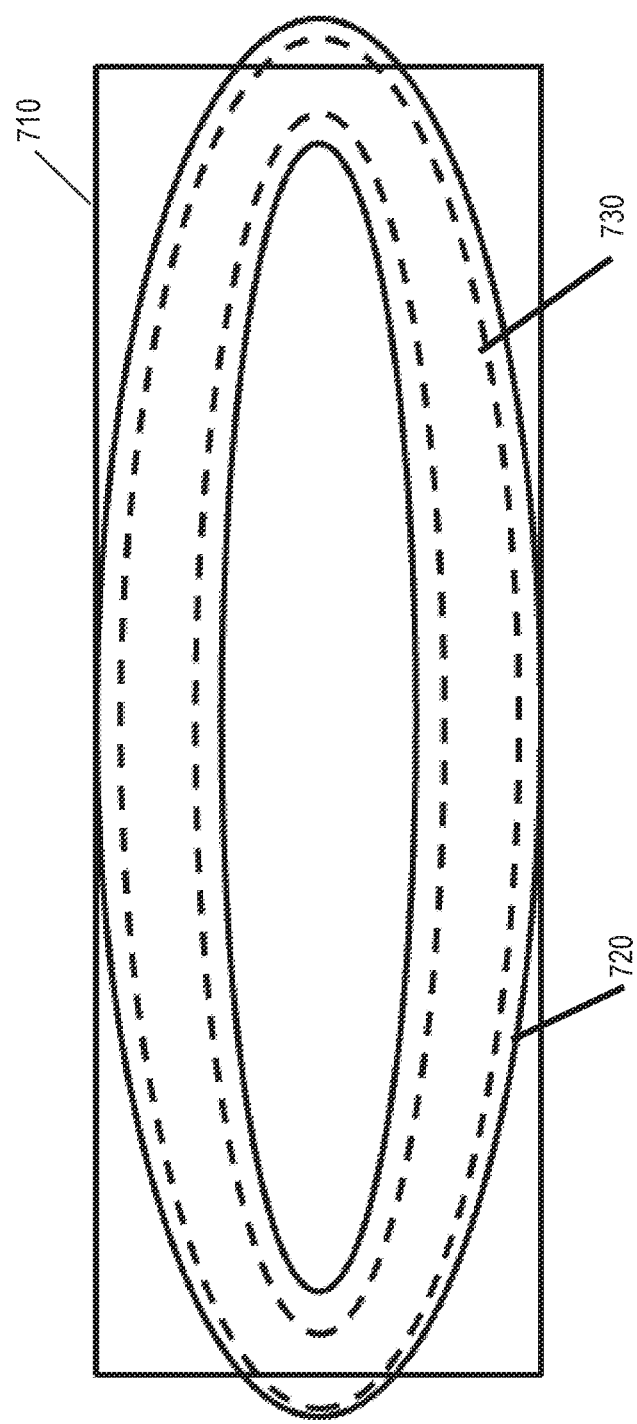
FIG. 7 illustrates an example of different types of deviations identified between process assumptions band and process variations band, according to one or more embodiments.

FIG. 7 illustrates examples of different types of deviations identified. For example, the shape 710 depicts the element of the wafer according to the design rules 11 (that is target band), the shape 720 illustrated in bold lines depicts the PA band, and the shape 730 illustrated in dashed lines depicts the PV band. It is understood that in other examples, the shapes of the bands may be different than those illustrated.

Based on the three shapes, the design 710, the PA band 720, and the PV band 730, the system 100 determines if the PA band 720 is outside the PV band 730, relative to the design 710, or if the PV band 730 band is outside the PA band 720, relative to the design 710. In one or more examples, the system 100 compares contours of the shapes to determine the relation between the shapes. Based on the relation, the system 100 determines the type of deviation. Further, based on the type of the deviation, the system 100 identifies which of the design rules 11 are to be further inspected, and/or updated. For example, consider an example scenario that the design rule 11 indicates that the PV band 730 should be 100% within the PA band 720. If the comparison detects that the PV band 730 is outside the PA band 720, the system 100 notifies checking the space rules, even if the tolerances are complied with during DRC. The space rules specify the minimum distance between two adjacent objects on the wafer. For example, in the above case, the system 100 identifies ensuring that space rules in the design rules 11 are compliant with the corresponding specifications and intent in the process assumption 19.

In another example, if the system 100 detects that the PA band 720 is outside the PV band 730 (which complies with the design rule in the example scenario), the system 100 ensures that enclosure rules in the design rules 11 meet the specifications and intent of the process assumptions 19. For example, the enclosure rules may specify that an object of one type, such as the contact or via 410, is covered, with a predetermined margin, by a metal layer, such as the element 440. It is understood that the above are just examples, and that the system may identify different types of rules from the design rules 11 based on the type of the deviation detected. For example, in other cases, the system 100 may identify inspecting width rules, minimum area rules, antenna rules, active to active spacing rules, well to well spacing rules, minimum channel length of the transistor rules, minimum metal width rules, metal to metal spacing rules, metal fill density (for processes using CMP) rules, poly density rules, ESD and I/O rules, among others.

Thus, the system 100 facilitates comparing the PV band 730 and the PA band 720 to identify deviations in shape, which can identify corner rounding errors. Typically, by only comparing PV bands with target layout, that is the design shape 710, the corner rounding has to be ignored, because the design shape is rectangular, while in practice fabrication does not print exact rectangles specified. Accordingly, the technical solutions described herein improve the typical methods by providing a further realistic comparison between PV bands, PA bands, and the target shapes.

If the recalculated design rules pass the DRC, the method proceeds to verification procedure 30, which verifies the mask manufacturability (see FIG. 1C). In case the recalculated design rules are not compliant, the method includes verifying whether the PV bands can be made improved to match the process assumptions 19, as shown at 670. If the PV-bands can be modified to satisfy the process assumptions 19, the system 100 generates OPC keywords for refining the model 21 used for the OPC simulation, as shown at 680. The method further includes using the refined OPC model according to the keywords, and iterating through the operations described earlier using updated PV bands, as shown at 680 and 630.

Further, in case the PV bands cannot be modified to match with the process assumptions 19, the system 100 initiates the DFM process for design modification and/or optimization, as described herein, as shown at 675. In this case, the system 100 proceeds for updating the design of the layout of the wafer (or mask) as shown at 670 and 620. The system 100 loops through the operations with the updated layout, as shown at 670 and 620. Thus, if the PV bands can be modified to match the process assumptions 19, the DFM process is not performed, and consequently, no design change is performed. In other words, the DFM is only performed if the recalculated design rules do not satisfy DRC, and the PV bands cannot be modified to match the process assumptions 19.

Thus, the technical solutions described herein facilitate detecting errors in design rules and/or initial mask layouts with reference to process assumptions, prior to fabricating the wafer and/or mask. The technical solutions provide such technical advantages by comparing simulated contours of PA bands, PV bands, and design (and not wafer target layouts). Further, even if the simulated contours are within predetermined tolerances, depending on the type of the deviation, the embodiments facilitate additional inspection of the design rules to ensure that the process assumptions are being complied with. Accordingly, the technical solutions ensure that the design rules used for OPC and designing a layout are compliant with the process assumption. Further yet, in response to the simulated contours not matching each other (or the design), the technical solutions described herein proceed to update the design rules and/or OPC, and not the layout of the wafer.

Thus, in other words, the technical solutions described herein facilitate generating the design rules, simulating PA bands based on the design rules, and comparing the PA bands with PV bands from OPC simulations. In response to a mismatch between the bands, the design rules are updated. Further yet, even in case the deviations between the bands are within tolerances in the design rules, depending on the type of the deviation, the technical solutions facilitate a user, such as a testing engineer, to identify the corresponding process assumption specifications and ensure that the design rules are compliant with the specifications and intent of the process assumptions. In one or more examples, the design rules are updated upon determining that the tolerances specified in the design rules are not compliant with the process assumptions. Further yet, the technical solutions go beyond identifying printing hotspot(s), by determining deviations caused by integration rules (rules concerning the interaction of levels).

By implementing the technical solutions described herein, printing deficiencies from OPC simulations can be filtered out and thus the impact of such deficiencies on designing a wafer (IC) can be minimized. For example, instead of changes to wafer layouts at a later stage, the technical solutions facilitate updating the design rules at an earlier stage, thus minimizing the impact. Thus, the technical embodiments described herein improve EDA tools, and in turn improve processes of foundries as well as a wafer (IC) design organizations, such as during DFM.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the present technical solutions have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments described herein.

What is claimed is:

1. A system for optimizing fabrication of a wafer, the system comprising:
   a memory; and
   a processor coupled with the memory, the processor configured to:
   generate a process assumption band for an element of the wafer, the process assumption band based on ground engineering and dimension variations at a side and an end of the element;
   generate a process variation band for the element of the wafer based on an optical proximity correction (OPC) simulation of the photolithographic process using design rules associated with the wafer;

determine a target band for the element, the target band comprising an on-wafer polygon of a circuit design layout;

determine a spatial relation between the process assumption band and the process variation band with respect to the target band, the spatial relation comprising one of a first type and a second type, the first type comprising the process variation band being outside the process assumption band and the second type comprising the process assumption band being outside the process variation band;

identifying either a space rule or an enclosure rule to check at a location of the target band based on whether the spatial relation comprises the first type or the second type; and modifying a layout of the wafer based on the checked space rule or enclosure rule recalculating one or more design rules from the design rules associated with the wafer based on a check of the space rule or the enclosure rule; and updating a circuit design of the wafer in response to the process variation band not being changeable to match the process assumption band.

2. The system of claim 1, wherein determining the relation comprises comparing, by the processor, a first contour of the process assumption band and a second contour of the process variation band.

3. The system of claim 1, wherein determining the relation deviation comprises determining a type of the deviation between the process assumption band and the process variation band.

4. The system of claim 1, wherein the processor is further configured to, in response to the recalculated design rules meeting predetermined criteria, transmit the recalculated design rules for fabrication of the wafer.

5. The system of claim 4, wherein the wafer is fabricated according to the updated circuit design.

6. A computer program product for optimizing fabrication of a wafer, the computer program product comprising a non-transitory computer readable storage medium, the non-transitory computer readable storage medium comprising computer executable instructions, wherein the non-transitory computer readable storage medium comprises instructions to:

generate a process assumption band for an element of the wafer, the process assumption band based on ground engineering and dimension variations at a side and an end of the element;

generate a process variation band for the element of the wafer based on an optical proximity correction (OPC) simulation of the photolithographic process using design rules associated with the wafer;

determine a target band for the element, the target band comprising an on-wafer polygon of a circuit design layout;

determine a spatial relation between the process assumption band and the process variation band with respect to the target band, the spatial relation comprising one of a first type and a second type, the first type comprising the process variation band being outside the process assumption band and the second type comprising the process assumption band being outside the process variation band;

identifying either a space rule or an enclosure rule to check at a location of the target band based on whether the spatial relation comprises the first type or the second type; and modifying a layout of the wafer based on the checked space rule or enclosure rule recalculating one or more design rules from the design rules associated with the wafer based on a check of the space rule or the enclosure rule; and updating a circuit design of the wafer in response to the process variation band not being changeable to match the process assumption band.

7. The computer program product of claim 6, wherein determining the relation deviation comprises determining a type of the deviation between the process assumption band and the process variation band.

8. The computer program product of claim 7, wherein the type of the relation deviation identifies that the process assumption band is within the process variation band or identifies that the process variation band is within the process assumption band.

9. The computer program product of claim 8, wherein the non-transitory computer readable storage medium further comprises instructions to determine modifications to the design rules for updating the design rules based on the relation that is identified.

10. The computer program product of claim 6, wherein the non-transitory computer readable storage medium further comprises instructions to, in response to the recalculated design rules meeting predetermined criteria, transmit the recalculated design rules for fabrication of the wafer.

* * * * *